United States Patent
Ko

(10) Patent No.: US 7,532,582 B2
(45) Date of Patent: May 12, 2009

(54) METHOD FOR SELECTING ROUTE IN ROUTING PROTOCOL

(75) Inventor: Eun-Sook Ko, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 671 days.

(21) Appl. No.: 11/319,717

(22) Filed: Dec. 29, 2005

(65) Prior Publication Data

US 2006/0146828 A1    Jul. 6, 2006

(30) Foreign Application Priority Data

Jan. 4, 2005    (KR) .................... 10-2005-0000590

(51) Int. Cl.
*H04L 12/26*    (2006.01)
(52) U.S. Cl. ..................................... 370/252
(58) Field of Classification Search ................. 370/252
See application file for complete search history.

(56) References Cited

U.S. PATENT DOCUMENTS

2006/0159100 A1*   7/2006   Droms et al. ............ 370/395.2
2007/0280135 A1*  12/2007   Syed et al. ............... 370/254

* cited by examiner

*Primary Examiner*—Melvin Marcelo
(74) *Attorney, Agent, or Firm*—Robert E. Bushnell, Esq.

(57) ABSTRACT

A method for selecting a route in a routing protocol includes the steps of: measuring a message reachable time between a plurality of route information managers which manage route information on a network; constructing a reachable time table for managing the message reachable time; checking hop counts of different neighboring route information managers by a receiving route information manager which receives the same route information from the different neighboring route information managers; and selecting an optimum route based on the reachable time table when the neighboring route information managers have the same hop count. Thus, it is possible to reflect network status that varies constantly in selecting an optimum route in a routing protocol, thus maximizing optimum route effects and increasing transmission efficiency of a network.

14 Claims, 8 Drawing Sheets

| ADDRESS FAMILY (610) | NEIGHBOR (620) | REACHABLE TIME(MS) (630) |
|---|---|---|
| IPv4 | 16.1.2.2 | 820ms |
| IPv6 | 3ffe:0:0:1::2 | 1300ms |
| ⋮ | ⋮ | ⋮ |

FIG. 6

| VALUE | DEACRIPTION | REFERENCES |
|---|---|---|
| 1 | ORIGIN | RFC 1771 |
| 2 | AS_PATH | RFC 1771 |
| 3 | NEXT_HOP | RFC 1771 |
| 4 | MULTI_EXIT_DISC | RFC 1771 |
| 5 | LOCAL_PREF | RFC 1771 |
| 6 | ATOMIC_AGGREGATE | RFC 1771 |
| 7 | AGGREGATOR | RFC 1771 |
| 8 | COMMUNITY | RFC 1997 |
| 9 | ORIGINATOR_ID | RFC 1966, RFC 1998 |
| 10 | CLUSTER_LIST | RFC 1966, RFC 1998, RFC 2796 |
| 11 | DPA | |
| 12 | ADVERTISER | RFC 1863 |
| 13 | RCID_PATH / CLUSTER_ID | RFC 1863 |
| 14 | MP_REACH_NLRI | RFC 2283, RFC 2858 |
| 15 | MP_UNREACH_NLRI | RFC 2283, RFC 2858 |
| 16 | EXTENDED COMMUNITIES | |
| 17 | NEW_AS_PATH | |
| 18 | NEW_AGGREGATOR | |
| 19 | SSA, SAFI Specific Attribute | |
| 20 | Connector Attribute | |
| 21 ~ 254 | Not defined | |
| 255 | Reserved | |

METHOD FOR SELECTING ROUTE IN ROUTING PROTOCOL

CLAIM OF PRIORITY

This application makes reference to, incorporates the same herein, and claims all benefits accruing under 35 U.S.C. § 119 from an application for *METHOD FOR SELECTING ROUTE IN ROUTING PROTOCOL* earlier filed in the Korean Intellectual Property Office on Jan. 4, 2005 and there duly assigned Serial No. 2005-0000590.

BACKGROUND OF THE INVENTION

1. Technical Field

The present invention relates to a routing protocol, and more particularly, to a method for selecting an optimum route by reflecting network changes in a routing protocol.

2. Related Art

A routing protocol is a communication regulation for network routing, and determines a route among devices (e.g., routers) organizing a network. For example, the routers designate an optimum route for packets by referring to a pre-stored routing table when there is a packet transmission request. The routing protocol is a protocol for delivering information (e.g., routing information) for updating the routing table among the routers.

Since the Internet has recently expanded extensively, it is difficult to update routing tables of all routers using one routing protocol. Thus, the Internet has been divided into autonomous systems (AS) operated by one management authority, and separate routing protocols are used for inner routing in respective autonomous systems and for outer routing between the autonomous systems, respectively.

The protocols most commonly used as an inner routing protocol and an outer routing protocol include a routing information protocol (RIP) and an open shortest path first (OSPF) as inner routing protocols, and a border gateway protocol (BGP) as an outer routing protocol.

RIP is a protocol using a distance vector algorithm which dynamically determines a shortest route depending on hop counts of the routers through which the RIP passes. OSPF is a protocol which supports routing through the shortest route by combining inter-node distance information and link status information with the routing information in real time so that users select the shortest route in an Internet network. BGP is a protocol for the exchange of routing information among gateway hosts in the network of the Autonomous System.

Recently, as the scale of a network has expanded, routing protocols have been getting more important for increasing transmission efficiency of the network. In other words, how quickly the routing protocol selects an optimum route by reflecting changes on the network has become a key factor. Conventional routing protocols, however, have focused on transmission reliability rather than processing speed. Moreover, the conventional routing protocols have been unable to adapt to changes on the network in selecting the optimum routing path. For example, BGP, as a protocol, has focused on how to reliably transmit routing information to neighboring routers, and thus it is relatively poor when it comes to updating the routing information through a fast route.

If one of the ASs (hereinafter, referred to as receiving AS) transmitting routing information using the BGP receives a plurality of the same route information from different neighboring ASs (hereinafter, referred to as transmitting ASs), the receiving AS determines whether the transmitting ASs have the same hop count. That is, the receiving AS determines whether the different neighboring ASs transmitting the same route information have the same hop count. As a result of that determination, if it is determined that the transmitting ASs have the same hop count, the receiving AS establishes an optimum route using the earliest received route information. Otherwise, the receiving AS establishes the optimum route using route information which is received from the AS having a smaller hop count than the receiving AS.

On the other hand, if it is determined that the receiving AS has not received the same route information from a plurality of different neighboring ASs, but has received different route information from different neighboring ASs, the receiving AS establishes the route using the received route information.

Presuming that AS1, AS2 and AS3 are connected to network A and transmit routing information using BGP, AS3 calculates the hop counts of AS1 and AS2 when receiving the same route information from AS1 and AS2. This is accomplished so that AS3 can select an optimum route using the route information of whichever one of AS1 and AS2 has the smaller hop count.

However, AS1 and AS3, and AS1 and AS2, are interconnected via the same number of routes. AS3 and AS1 are interconnected via a first router R1 and a second router R2. AS3 and AS2 are interconnected via a third router R3 and a fourth router R4. Therefore, from the viewpoint of AS3, AS1 and AS2 have the same hop count.

In this case, AS3 establishes an optimum route using whichever one of the route information from AS1 or the route information from AS2 is received earlier. For instance, if AS3 receives the route information from AS2 after receiving the route information from AS1, AS3 establishes the optimum route using the route information received from AS1. However, if the transmission speed of a route from AS1 to AS3 (hereinafter, referred to as the first route) is slower than that of a route from AS2 to AS3 (hereinafter, referred to as the second route) due to network traffic on the first route, it is an optimal selection for AS3 to select AS2 as the next hop. However, AS3 selects AS1 as the next hop based on the above-mentioned criteria. In other words, AS3 selects AS1 as the next hop because AS1 transmitted the route information first.

As mentioned above, there is a disadvantage in that the conventional routing protocols are unable to properly reflect changes on the network in selecting an optimum routing route. That is, there is a disadvantage in that the conventional routing protocols cause an error in selecting an optimum route because they select the optimum route without reflecting traffic volume on each link on a network.

SUMMARY OF THE INVENTION

It is an object of the invention to provide a method for selecting a route by reflecting network traffic volume that varies constantly in a routing protocol.

It is another object of the invention to provide the capability of selecting an optimum route in a routing protocol.

According to an aspect of the present invention, there is provided a method for selecting a route in a routing protocol, comprising the steps of: measuring a message reachable time between a plurality of route information managers which manage route information on a network, and constructing a reachable time table for managing the message reachable time; checking hop counts of different neighboring route information managers at a receiving route information manager which receives the same route information from the different neighboring route information managers; and selecting an optimum route based on the reachable time table when the neighboring route information managers have the same hop count.

Preferably, the step of constructing a reachable time table for managing the message reachable time includes the step of measuring a time until a first route information manager receives a response message after transmitting a predetermined message to a second neighboring route information manager so as to construct the reachable time table.

Preferably, the reachable time table is constructed by the respective route information managers and contains address information and reachable time of the respective route information managers adjacent to a corresponding route information manager.

Preferably, the step of constructing a reachable time table for managing the message reachable time includes the steps of: transmitting, by means of a first route information manager having a reachable time attribute as enabled, a reachable time request message to a second neighboring route information manager; transmitting, by means of the second route information manager, to the first route information manager a reply message in response to the reachable time request message when a reachable time attribute of the second route information manager is enabled; calculating a reachable time until the first route information manager receives a reply message after transmitting the reachable time request message; and updating the reachable time table with the reachable time.

Preferably, the step of transmitting, by means of the first route information manager having a reachable time attribute as enabled, a reachable time request message to the second neighboring route information manager includes the step of transmitting a reachable time request message including a time stamp of the first route information manager.

Preferably, the step of transmitting, by means of the second route information manager, to the first route information manager a reply message to the reachable time request message includes the step of transmitting a reply message which is the same as the reachable time request message but which has a changed message type.

Preferably, each of the reachable time request message and the reply message includes: a type area indicating that a relevant message is a reachable time related message; a subtype area indicating whether the relevant message is the reachable time request message or the reply message of the reachable time related message; and a time information area storing an initial time for transmitting the reachable time request message.

Preferably, the step of transmitting, by means of the first route information manager having a reachable time attribute as enabled, a reachable time request message to a second neighboring route information manager includes the step of periodically transmitting the reachable time request message.

Preferably, the step of transmitting, by means of the first route information manager having a reachable time attribute as enabled, a reachable time request message to the second neighboring route information manager includes the step of transmitting the reachable time request message several times, and the step of calculating includes the step of calculating the reachable time as an average value of reachable times of the reply messages generated in response to the respective reachable time request messages.

Preferably, the step of transmitting, by means of the first route information manager having a reachable time attribute as enabled, a reachable time request message to a second neighboring route information manager includes the step of transmitting the reachable time request message to the respective neighboring route information managers at predetermined intervals when a plurality of the route information managers are adjacent to the first route information manager.

Preferably, the step of updating includes the step of adding the address information and the reachable time of the second route information manager to the reachable time table when there is no reachable time information for the second route information manager in the reachable time table.

Preferably, the step of updating includes the step of changing pre-stored reachable information into the calculated reachable time when the reachable time information for the second route information manager already exists in the reachable time table, and the calculated reachable time is greater than the reachable time information stored previously in the reachable time table.

Preferably, the step of updating includes the step of changing the previously stored reachable time information when the difference between the previously stored reachable time information and the calculated reachable time exceeds a predetermined threshold.

Preferably, the routing protocol is the border gateway protocol (BGP) and the route information manager is an autonomous system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 illustrates a reachable time table (REACHABLE_TIME table) according to an embodiment of the present invention;

FIG. 6 shows attributes of a typical border gateway protocol (BGP);

DETAILED DESCRIPTION OF THE INVENTION

Figure 1:
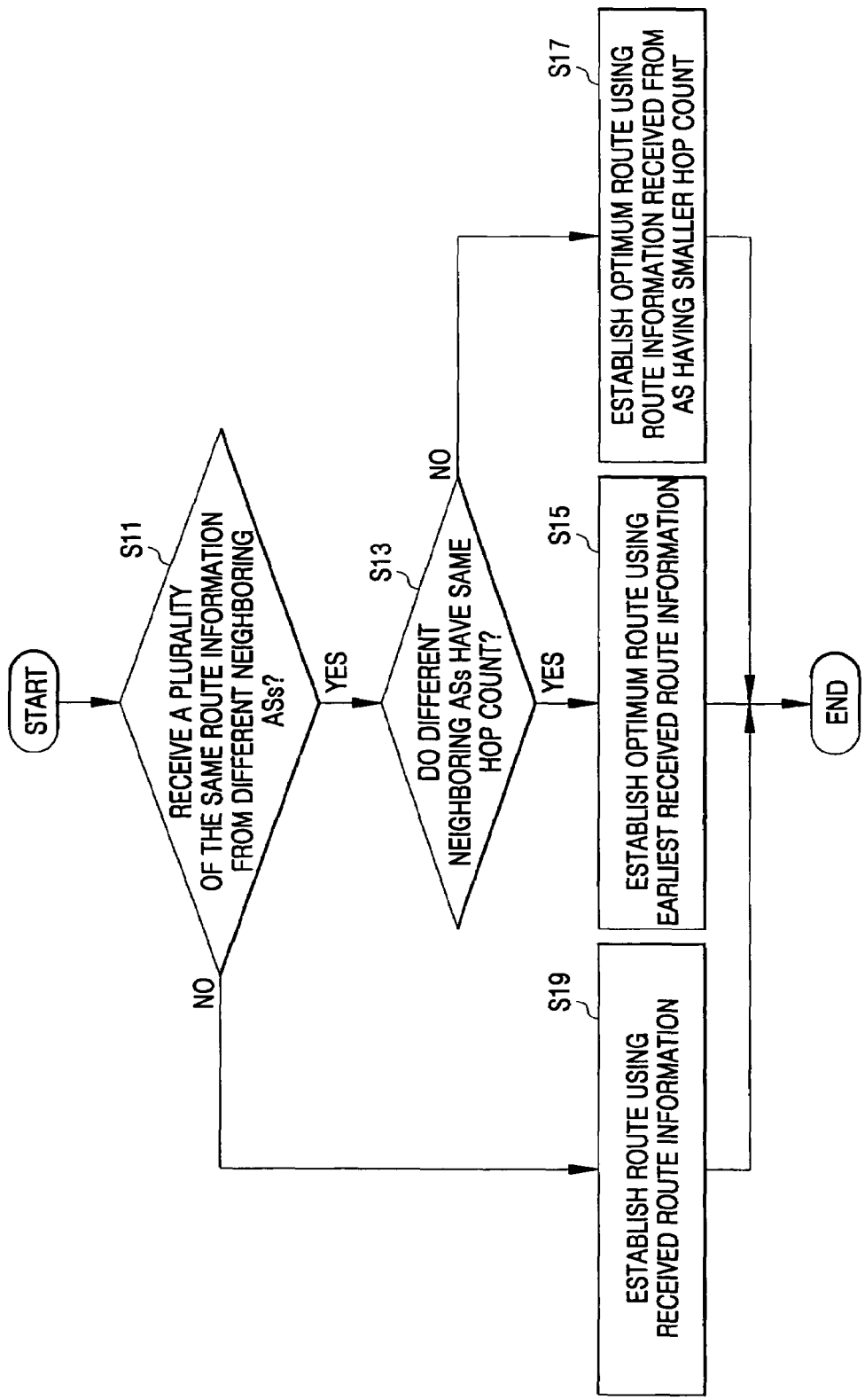
FIG. 1 is a flowchart of a route selecting method.

The present invention will be described with reference to the accompanying drawings, in which preferred embodiments of the invention are shown. In the drawings, whenever the same element reappears in a subsequent drawing, it is denoted by the same reference numeral. Furthermore, in explaining the invention, unnecessary detailed explanation is omitted when its explanation is considered to obscure the subject of the invention.

FIG. 1 is a flowchart of a route selecting method.

In particular, FIG. 1 illustrates a method by which an AS transmitting routing information using BGP selects a routing path based on route information received from neighboring ASs.

Referring to FIG. 1, if one of the ASs (hereinafter, referred to as receiving AS) transmitting the routing information using the BGP receives a plurality of the same route information from different neighboring ASs (hereinafter, referred to as transmitting AS) (S11), the receiving AS determines whether the transmitting ASs have the same hop count (S13). That is, the receiving AS determines whether the different neighboring ASs transmitting the same route information have the same hop count. As a result of that determination, if it is determined that the transmitting ASs have the same hop count, the receiving AS establishes an optimum route using the earliest received route information (S15). Otherwise, the receiving AS establishes the optimum route using route information which is received from the AS having a smaller hop count than the receiving AS (S17).

On the other hand, if it is determined in S11 that the receiving AS does not receive the same route information from a plurality of different neighboring ASs, but receives different route information from different neighboring ASs, the receiving AS establishes the route using the received route information (S19).

Figure 2:
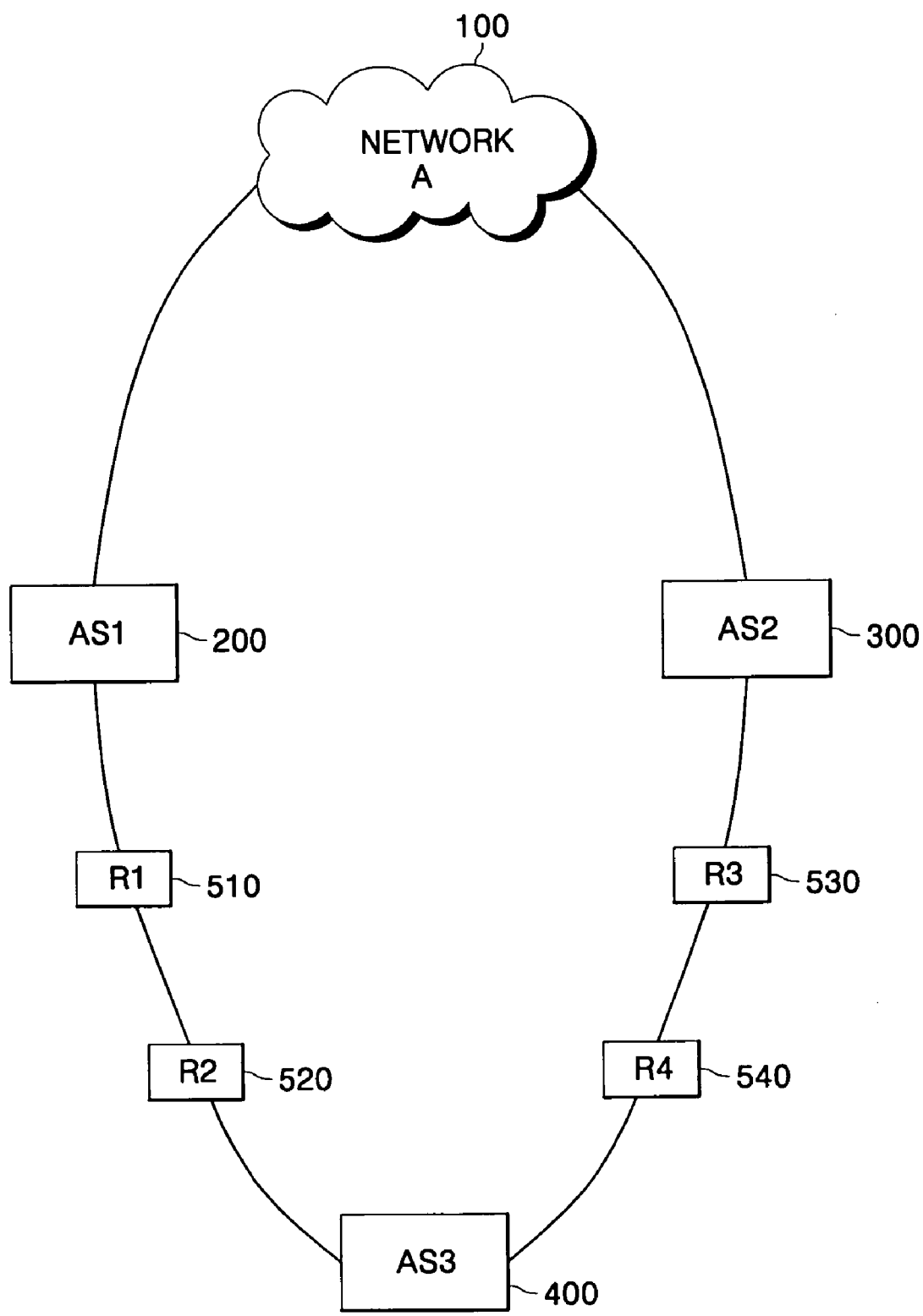
FIG. 2 shows transmission routes among ASs in a network.

FIG. 2 illustrates transmission routes among ASs on a network.

In the example of FIG. 2, presuming that AS1 200, AS2 300 and AS3 400 are connected to network A 100 and transmit routing information using BGP, AS3 400 calculates hop counts of AS1 200 and AS2 300 when receiving the same routing information from AS1 200 and AS2 300. This is carried out for the purpose of selection, by AS3 400, of an optimum route using the route information of whichever one of AS1 200 and AS2 300 has the of smaller hop count.

However, in the example of FIG. 2, AS1 200 and AS3 400, and AS1 200 and AS2 300, are interconnected via the same number of routes. AS3 400 and AS1 200 are interconnected via a first router R1 510 and a second router R2 520. AS3 400 and AS2 300 are interconnected via a third router R3 530 and a fourth router R4 540. Therefore, from the viewpoint of AS3 400, AS1 200 and AS2 300 have the same hop count.

In this case, AS3 400 establishes an optimum route using whichever one of the route information from AS1 200 and the route information from AS2 300 is received earlier. For instance, if AS3 400 receives the route information from AS2 300 after receiving the route information from AS1 200, AS3 400 establishes the optimum route using the route information received from AS1 200. However, if the transmission speed of a route from AS1 200 to AS3 400 (hereinafter, referred to as the first route) is slower than that of a route from AS2 300 to AS3 400 (hereinafter, referred to as the second route) due to network traffic on the first route, it is an optimal selection for AS3 400 to select AS2 300 as the next hop. However, AS3 400 selects AS1 200 as the next hop based on the above-mentioned criteria. In other words, AS3 400 selects AS1 200 as the next hop because AS1 200 transmitted the route information first.

Figure 3:
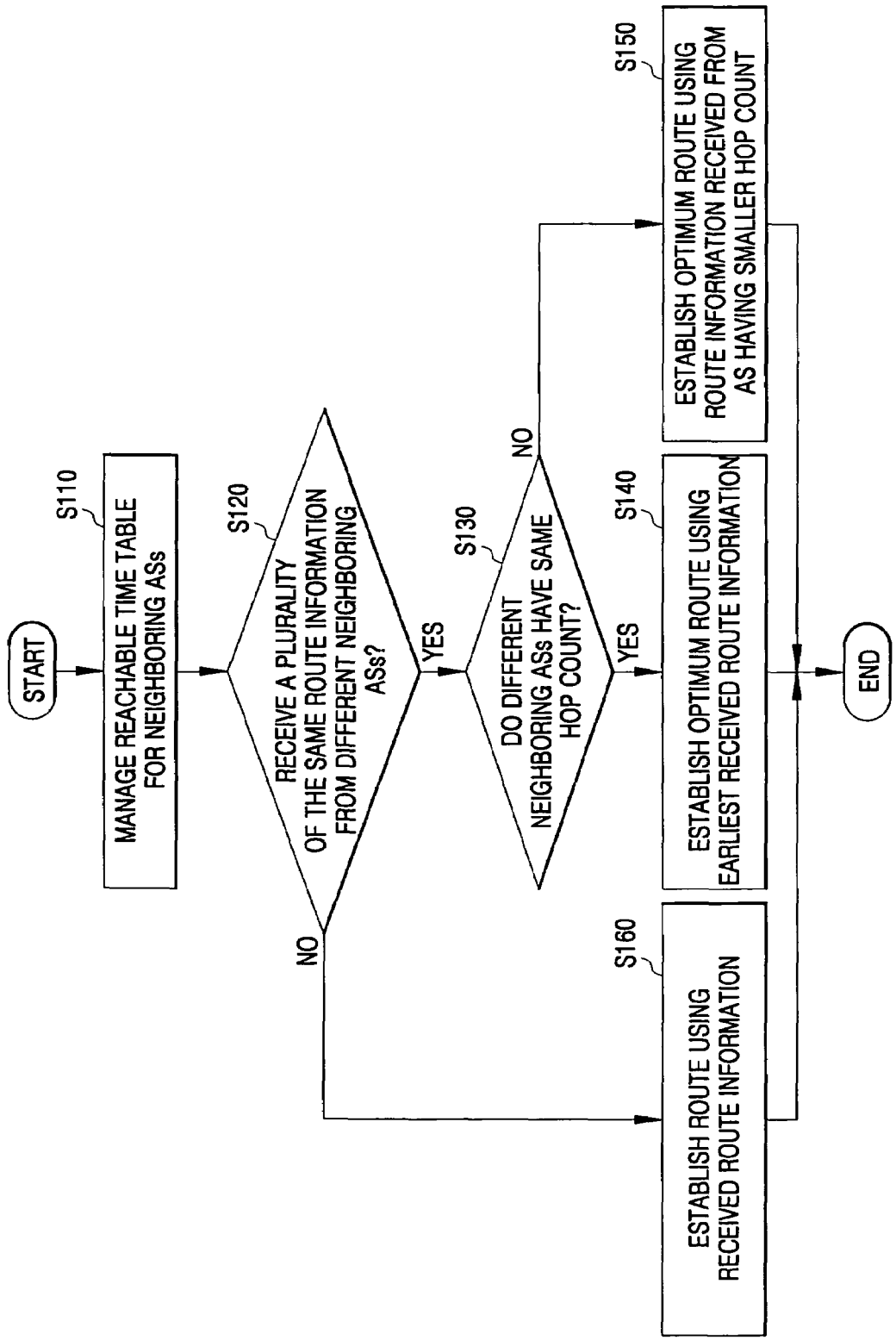
FIG. 3 is a flowchart illustrating a method for selecting a route according to an embodiment of the present invention.

FIG. 3 is a flowchart illustrating a method for selecting a route according to an embodiment of the present invention. In particular, FIG. 3 illustrates how ASs transmitting routing information using BGP select a routing path based on route information which is received from neighboring ASs.

Referring to FIG. 3, ASs transmitting routing information the BGP manage a reachable time table for neighboring ASs (S110). For example, an AS manages a table for respective neighboring ASs needed to manage the time (hereinafter, referred to as "reachable time") until any message (hereinafter, referred to as a "reachable time request message" ('REACHABLE (REQUEST) message')) sent to the respective neighboring ASs returns. A method of constructing and managing the reachable time table will be described in detail with reference to FIGS. 4 and 5.

If one of the ASs managing the reachable time table (hereinafter referred to as "receiving AS") receives the same route information from different neighboring ASs (hereinafter, referred to as "transmitting ASs") (S120) as described above, the receiving AS determines whether the transmitting ASs have the same hop count (S130). That is, the receiving AS determines whether different neighboring ASs transmitting the same route information have the same hop count.

If it is determined in S130 that the transmitting ASs have the same hop count, the receiving AS establishes an optimum route based on the reachable time table (S140). For example, the receiving AS checks respective reachable times of the transmitting ASs by referring to the reachable time table, and establishes an optimum route using the route information received from the AS having the shortest reachable time among the transmitting ASs. In other words, the receiving AS establishes the AS having the shortest reachable time as a next hop. If it is determined in S130 that the transmitting ASs do not have the same hop count, the receiving AS establishes an optimum route using the route information received from the AS having the smaller hop count (S150). That is, the receiving AS sets AS having the least hop count as the next hop.

On the other hand, if it is determined in S120 that the receiving AS does not receive the same route information from a plurality of different neighboring ASs, but receives different route information from different neighboring ASs, the receiving AS establishes the route using the received route information (S160).

In the example of FIG. 2, presuming that AS1 200, AS2 300 and AS3 400 are connected to the network A 100 and transmit routing information using BGP, according to the embodiment of the invention, AS1 200, AS2 300 and AS3 400 manage the reachable time table for the neighboring ASs. Moreover, when AS3 400 receives the same route information from AS1 200 and AS2 300 which have the same hop count, AS3 400 designates the AS having the shorter reachable time as the next hop based on the reachable time table.

For instance, if AS3 400 receives the route information from AS2 300 after receiving the route information from AS1 200, and the transmitting speed of the a route from AS1 200 to AS3 400 (hereinafter, referred to as the first route) is slower than that of the route from AS2 300 to AS3 400 (hereinafter, referred to as the second route) due to network traffic on the first route, AS3 400 will designate the AS having the shorter reachable time as the next hop based on the reachable time table. In the above example, since the transmitting speed of the route from AS1 200 to AS3 400 (i.e., the first route) is slower than that of the route from AS2 300 to AS3 400 (i.e., the second route), the AS2 300 has the shorter reachable time. Therefore, in this case, AS3 400 will designate AS2 300 as the next hop.

FIG. 4 shows a reachable time table (REACHABLE_TIME table) according to an embodiment of the present invention. Referring to FIG. 4, the reachable time table for each AS managing the reachable time of respective neighboring ASs adjacent to the AS includes an area 610 for storing an address family of the neighboring ASs, an area 620 for storing addresses of the neighboring ASs, and an area 630 for storing the reachable time of the ASs. In the example of FIG. 2, if AS1 200 is connected to an IPv4 network and its address and reachable time are '16.1.2.2' and '820 ms', respectively, and if AS2 300 is connected to an IPv6 network and its address and reachable time are '3ffe:0:0:1::2' and '1300 ms', respectively, the reachable time table stored in the AS3 400 is as shown in FIG. 4.

In this case, AS3 400 will designate AS1 200, having the shorter reachable time, as the next hop.

Figure 5:
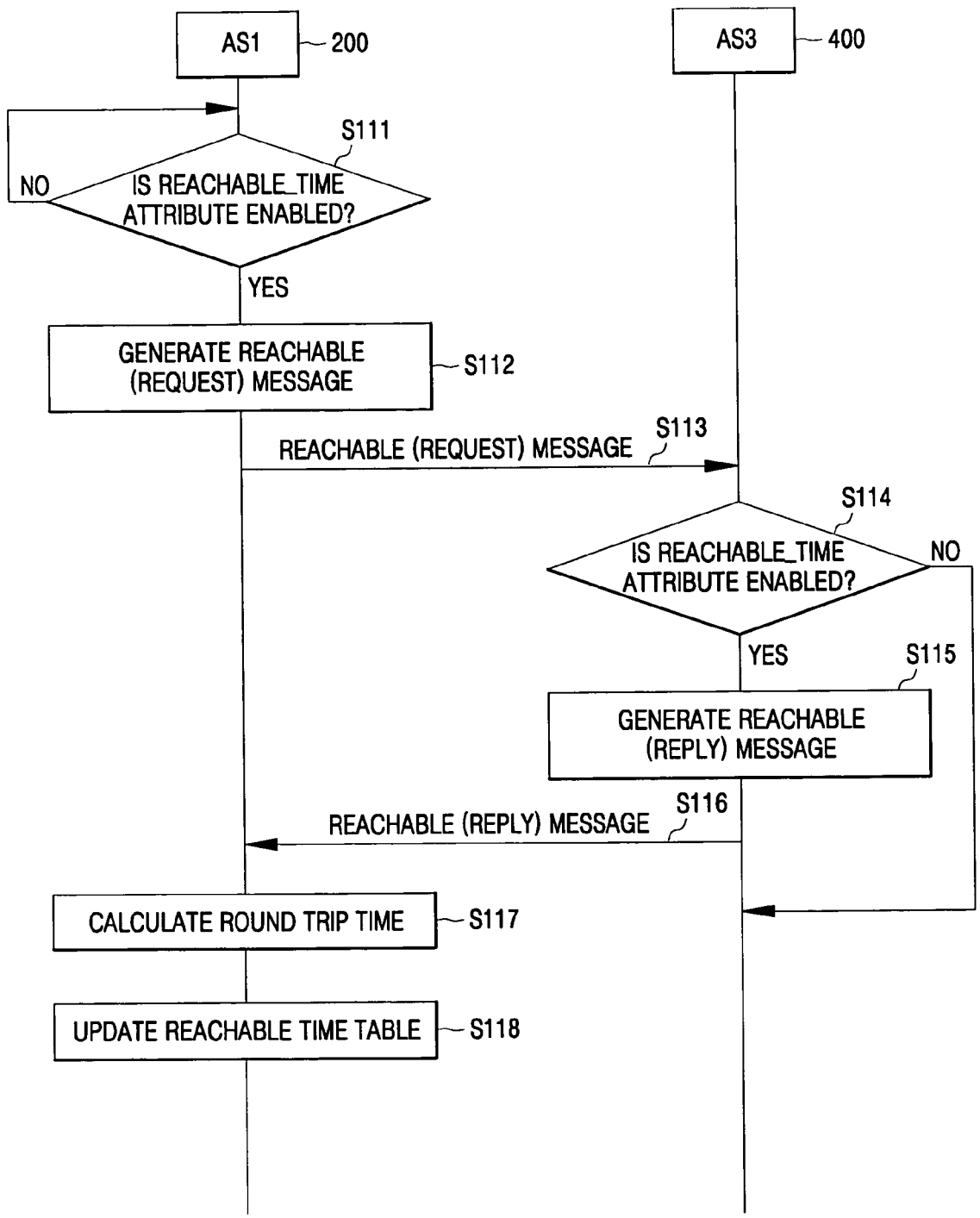
FIG. 5 is a flowchart illustrating a management procedure for a reachable time table (REACHABLE_TIME table) according to an embodiment of the present invention.

FIG. 5 is a flowchart illustrating a management procedure for a reachable time table (REACHABLE_TIME table) according to an embodiment of the present invention. Specifically, FIG. 5 shows a method of managing a reachable time table through measurement of the reachable time of AS3 400, i.e., one of the ASs adjacent to AS1 200 in a network having the structure shown in FIG. 2.

Referring to FIG. 5, AS1 200 determines whether its reachable time attribute (REACHABLE_TIME attribute) is available (S111). That is, it is determined whether the reachable time attribute of AS1 200 is enabled. The process proceeds to the next step only if the reachable time attribute is enabled. For this, it is preferable that AS1 200 add the reachable time attribute recorded on one of the unused areas in a table defining a typical BGP attribute to indicate whether the attribute is used. This reachable time attribute will be explained in detail with reference to FIGS. 6 and 7A to 7C.

If it is determined in S111 that the reachable time attribute of AS1 200 is enabled, AS1 200 generates a reachable time request message (REACHABLE (REQUEST) message) (S112), and transmits it to AS3 400 (S113) in order to measure the reachable time of AS3 400. In S113, AS1 200 transmits the reachable time request message, including a time-stamp value of the AS1 200. In other words, AS1 200 transmits to AS3 400 a reachable time request message which includes time information about a time when the reachable time request message is transmitted to AS3 400. The structure of the reachable time request message generated in S112 will be explained in detail with reference to FIG. 8.

Then, AS3 400 determines whether its reachable time attribute (REACHABLE_TIME attribute) is enabled and available (S114), and then generates a reply message to the reachable time request message (S115) and transmits it to AS1 200 (S116) only if the reachable time attribute is enabled and available. That is, if the reachable time attribute of AS3 400 is enabled, AS3 400 changes only the type of the received reachable time request message to generate a reply message (RECHARGEABLE (REPLY) message), and then transmits the reply message to AS1 200. In particular, at this time, AS3 400 does not add its time stamp value to the reply message. In other words, AS3 400 transmits the reply message to AS1 200 without changing the time information contained in the reachable time request message.

In response to receiving the reply message, AS1 200 compares the time information included in the reply message and current time information to calculate a round trip time (S117). For example, AS1 200 calculates the time that it took to receive a response message after transmitting the reachable time request message to the AS3 400.

AS1 200 then updates the pre-stored reachable time table with the calculation result (S118). If there is no pre-stored reachable time information of AS3 400 in the reachable time table, AS1 200 additionally registers the IP address and the reachable time of AS3 400 in the reachable time table. If there is pre-stored reachable time information of AS3 400 in the reachable time table but the time information has a greater value than that calculated in S117, AS1 200 changes the pre-stored reachable time information to the new value calculated in S117.

Preferably, in order to measure a fairer reachable time in S117, AS1 200 transmits the reachable time request message several times, receives respective reply messages, and calculates an average value of the respective reachable times to update the reachable time table with the average value.

Furthermore, it is preferable that an appropriate threshold (e.g. 500 ms) be used in order to prevent the table from being unnecessarily changed in a next hop due to a minor difference between the reachable times.

Although the example of FIG. 5 shows that AS1 200 transmits the reachable time request message to AS3 400 and receives a reply message therefrom, AS1 200 actually transmits the messages to all neighboring ASs, and receives respective reply messages from the neighboring ASs. AS1 200 then updates the reachable time table stored in AS1 200 using the results.

Furthermore, it is preferable that the process shown in FIG. 5 be performed periodically (e.g., every 60 secs.) while the relevant AS is activated. In other words, AS1 200 updates the reachable time of all neighboring ASs periodically. For instance, AS1 200 periodically updates the reachable time of all neighboring ASs according to the procedures shown in FIG. 5.

At this time, in order to prevent overload of the network which may be caused by simultaneous transmission of the messages to all neighboring ASs, it is preferable that AS1 200 transmit the messages to the respective neighboring ASs at intervals. Also, it is preferable that the message transmission period be changeable by a manager.

FIG. 6 shows attributes of typical border gateway protocol (BGP). Referring to FIG. 6, in a typical border gateway protocol (BGP), twenty attributes numbered from 1 to 20 are defined, while attributes from 21 to 254 are not defined. Thus, the reachable time attribute according to the embodiment of the present invention is to be defined as any one value of 21 and 252.

Figure 7A:
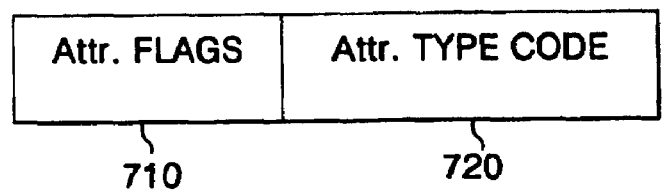
FIGS. 7A to 7C illustrate a reachable time attribute (REACHABLE_TIME attribute) according to an embodiment of the present invention.
Figure 7B:
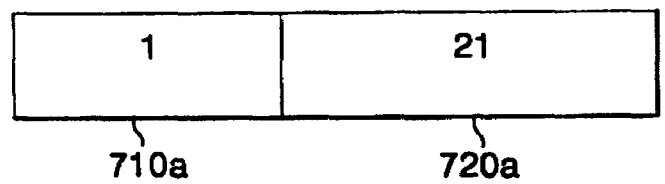
Figure 7C:
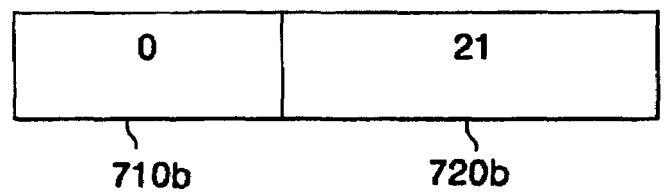

FIGS. 7A to 7C illustrate a reachable time attribute (REACHABLE_TIME attribute) according to an embodiment of the present invention.

FIG. 7A illustrates a typical format of a BGP attribute according to one embodiment of the present invention. Referring to FIG. 7A, the reachable time attribute 700 includes a flag area (Attr. Flags) 710 and a type code area (Attr. Type Code) 720. A value to indicate whether the reachable time attribute is enabled is stored in the flag area 710 and a reachable time attribute value is stored in the type code area 720.

FIGS. 7B and 7C show examples of cases where the reachable time attribute is enabled and not enabled, in which the number 21 is defined as the reachable time attribute.

Referring to FIG. 7B, when the reachable time attribute 700a is enabled, '1' is stored in the flag area 710a and a value (e.g. '21'), indicating that a relevant attribute is the reachable time attribute, is stored in the type code area 720a. Referring to 7C, when the reachable time attribute 700b is not disabled, '0' is stored in the flag area 710b and the value, indicating that a relevant attribute is the reachable time attribute (e.g. '21'), is stored in the time code area 720b.

Figure 8:
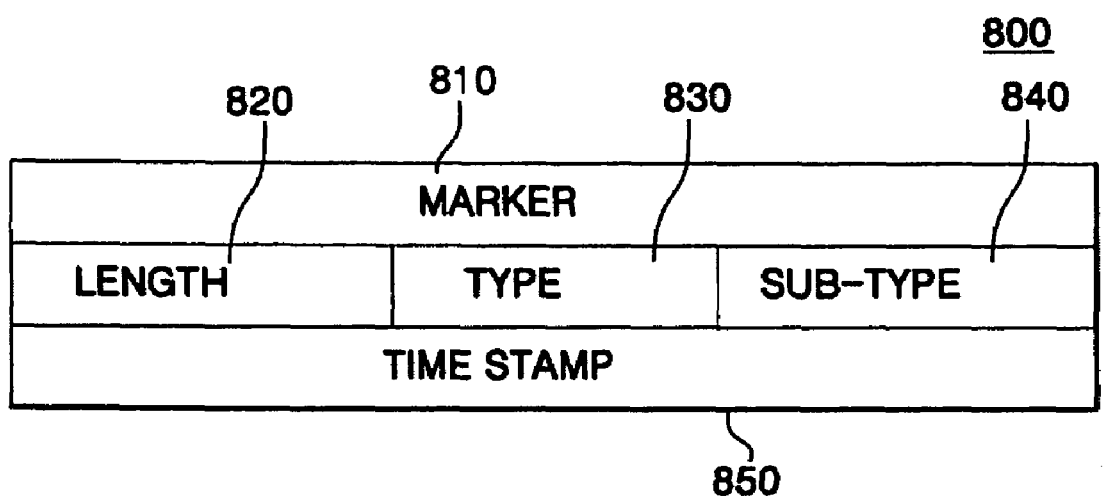
FIG. 8 illustrates a reachable time message format (REACHABLE_TIME message format) according to an embodiment of the present invention.

FIG. 8 illustrates a reachable time message format (REACHABLE_TIME message format) according to an embodiment of the present invention. In other words, FIG. 8 shows an example of the structure of a reachable time request message (REACHABLE (REQUEST) message) and a reply message (REACHABLE (REPLY) message). Referring to FIG. 8, the format of the reachable time message 800 according to one embodiment of the present invention includes a marker area 810, a length area 820, a type area 830, a sub-type area 840, and a time stamp area 850. For instance, the reachable time message may be organized by adding the areas as shown in FIG. 8 to a BGP message header area.

In FIG. 8, if the type area 830 is 'REACHABLE,' it indicates that a relevant message is a reachable time message. If the type area 830 is 'REACHABLE' and the sub-type area 840 is 'REQUEST', this indicates that the relevant message is a reachable time request message. If the type area 830 is 'REACHABLE' and the sub-type area 840 is 'REPLY,' that indicates that the relevant message is a reply message.

While the present invention has been described with reference to exemplary embodiments thereof, it should be understood that various changes in form and detail may be made therein without departing from the spirit and scope of the present invention. Although the case of BGP is illustrated by way of example only in the detailed explanation of the invention, the invention is not limited to BGP. In other words, the invention relates to every routing protocol. Therefore, the scope of the invention should be not limited to the embodiments described above, should be defined as set forth in the following claims.

What is claimed is:

1. A method for selecting a route in a routing protocol, comprising the steps of: measuring a message reachable time between a plurality of route information managers which manage route information on a network;

constructing a reachable time table for managing the message reachable time;

checking hop counts of different neighboring route information managers by means of a receiving route information manager which receives same route information from the different neighboring route information managers; and selecting an optimum route based on the reachable time table when the neighboring route information managers have identical hop counts.

2. The method according to claim 1, wherein the step of constructing the reachable time table for managing the message reachable time comprises the step of measuring a time until a first route information manager receives a response message after transmitting a predetermined message to a second neighboring route information manager so as to construct the reachable time table.

3. The method according to claim 1, wherein the reachable time table is constructed by respective route information managers, and contains address information and reachable time of the respective route information managers adjacent to a corresponding route information manager.

4. The method according to claim 3, wherein the step of constructing the reachable time table for managing the message reachable time comprises the steps of:

transmitting, by means of a first route information manager having a reachable time attribute which is enabled, a reachable time request message to a second neighboring route information manager;

transmitting, by means of the second neighboring route information manager, to the first route information manager a reply message to the reachable time request message when a reachable time attribute of the second neighboring route information manager is enabled;

calculating a reachable time equal to a time lapse between transmission of the reachable time request message and reception, by the first route information manager, of a reply message; and updating the reachable time table with the reachable time.

5. The method according to claim 4, wherein the step of transmitting, by means of the first route information manager having a reachable time attribute which is enabled, the reachable time request message to the second neighboring route information manager comprises the step of transmitting the reachable time request message which includes a time stamp of the first route information manager.

6. The method according to claim 4, wherein the step of transmitting, by means of the second neighboring route information manager, to the first route information manager a reply message to the reachable time request message comprises the step of transmitting a reply message that is the same as the reachable time request message but which has a changed message type.

7. The method according to claim 4, wherein each of the reachable time request message and the reply message includes:

a type area indicating that a relevant message is a reachable time request message;

a sub-type area indicating that the relevant message is one of the reachable time request message and the reply message in response to the reachable time request message; and a time information area storing an initial time for transmitting the reachable time request message.

8. The method according to claim 4, wherein the step of transmitting, by means of the first route information manager having the reachable time attribute enabled, to the second neighboring route information manager a reachable time request message comprises the step of periodically transmitting the reachable time request message.

9. The method according to claim 4, wherein:

the step of transmitting, by means of the first route information manager having the reachable time attribute enabled, to the second neighboring route information manager a reachable time request message comprises the step of transmitting the reachable time request message several times; and the step of calculating the reachable time equal to the time lapse between transmission of the reachable time request message and reception, by the first route information manager, of a reply message comprises the step of calculating the reachable time as an average value of reachable times of plural reply messages generated in response to respective reachable time request messages.

10. The method according to claim 4, wherein the step of transmitting, by means of the first route information manager having the reachable time attribute enabled, to the second neighboring route information manager a reachable time request message comprises the step of transmitting the reachable time request message to respective neighboring route information managers at predetermined intervals when the respective route information managers are adjacent to the first route information manager.

11. The method according to claim 4, wherein the step of updating the reachable time table with the reachable time comprises the step of adding the address information and the reachable time of the second neighboring route information manager to the reachable time table when there is no reachable time information for the second neighboring route information manager in the reachable time table.

12. The method according to claim 4, wherein the step of updating the reachable time table with the reachable time comprises the step of changing pre-stored reachable information into the calculated reachable time when the reachable time information for the neighboring second route information manager already exists in the reachable time table, and the calculated reachable time is greater than reachable time information previously stored in the reachable time table.

13. The method according to claim 4, wherein the step of updating the reachable time table with the reachable time comprises the step of changing previously stored reachable time information when a difference between the previously stored reachable time information and the calculated reachable time exceeds a predetermined threshold.

14. The method according to claim 1, wherein the routing protocol is a border gateway protocol (BGP) and the route information manager is an autonomous system.

* * * * *